(12) United States Patent
Hirsch et al.

(10) Patent No.: US 7,062,431 B2
(45) Date of Patent: Jun. 13, 2006

(54) SPEECH ANALYZING STAGE AND METHOD FOR ANALYZING A SPEECH SIGNAL

(75) Inventors: Hans-Günter Hirsch, Eschweiler (DE); Volker Springer, Nürnberg (DE); Rainer Klisch, Nürnberg (DE); Karl Hellwig, Wonfurt (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 826 days.

(21) Appl. No.: 10/046,536

(22) Filed: Jan. 16, 2002

(65) Prior Publication Data

US 2002/0156622 A1 Oct. 24, 2002

(30) Foreign Application Priority Data

Jan. 26, 2001 (EP) ................... 01101814

(51) Int. Cl.
*G10L 15/00* (2006.01)
*G10L 19/00* (2006.01)
(52) U.S. Cl. .............. 704/205; 704/201; 704/222
(58) Field of Classification Search ............. 704/205, 704/201, 222
See application file for complete search history.

(56) References Cited

U.S. PATENT DOCUMENTS 5,093,855 A  3/1992  Vollert et al.
5,848,097 A * 12/1998  Carney et al. .............. 375/219
2002/0184373 A1* 12/2002  Maes ........................ 709/228

OTHER PUBLICATIONS

Berkow et al. "Measuring Sound: Selection the FFT size" Syn-Aud-Con Newsletter, vol. 26, No. 1, Winter 1998, pp. 1, 2. http://www.prosoundweb.com/install/synaudcon/news26/fft_3.php.*
Rabiner et al. "Fundamentals of Speech Recognition" Prentice Hall, 1993, pp. 42-45, 69-93, and 122-124.*
ETSI Standard: "ETSI ES 201 108 V. 1.1.2 (200-04)" Internet Article, 'Online! XP002168143 Retrieved from the Internet:URL:www.etsi.org 'retreived on May 22, 2001!* paragraph '0004!—paragraph '0006!*.

(Continued)

*Primary Examiner*—V. Paul Harper
(74) *Attorney, Agent, or Firm*—Nixon & Vanderhye, P.C.

(57) ABSTRACT

A speech analyzing stage (12) and a method for analyzing a speech signal is described. The speech analyzing stage (12) is part of an automatic speech recognition system (10) and is adapted for analyzing in the spectral domain a speech signal sampled at one of at least two different system sampling rates. The speech analyzing stage (12) comprises a first spectral analyzer (18a) for analyzing the speech signal up to a first frequency ($f_{lowest}$) which is preferably derived from the lowest system sampling rate ($2 \times f_{lowest}$) and a second spectral analyzer (18b) for analyzing the speech signal at least above the first frequency ($f_{lowest}$).

26 Claims, 7 Drawing Sheets

OTHER PUBLICATIONS

Ssnderson C et al: "Effect of different sampling rates and feature vector sizes on speech recognition performance" Tencon '97 Brisbane—Australia. Proceedings of IEEE Tencon '97. IEEE Region 10 Annual Conference. Speech and Image Technologies for Computing and Telecommunications (Cat. No.97CH36162), Tencon '97 Brisbane—Austrailia Proceedings of IEEE Tencon '97, pp. 161-164 vol. 1, XP002168144 1997, New York, NY, USA, IEEE, USA ISBN: 0-7803-4365-4 *abstract * * paragraph '0001!; figures 1-6 *.

Gulzow T et al: "Comparison of a discrete wavelet transformation and a nonuniform polyphase filterbank applied to spectral-substraction speech enhancement" Signal Processing. European Journal Devoted to the Methods and Applications of Signal Processing, NL, Elsevier Science Publishers B.V. Amsterdam, vol. 64, No. 1, 1998, pp. 5-19, XP004108820 ISSN: 016501684 * abstract * * paragraph '03.1!—paragraph '03.2!*.

Fulton J A et al: "Sampling rate versus quantisation in speech coders" Signal Processing. European Journal Devoted to the Methods and Applications of Signal Processing, NL. Elsevier Science Publishers B.V. Amsterdam, vol. 56, No. 3, Feb. 1, 1997, pp. 209-218, XP003059508 ISSN: 0165-1684 * abstract *.

* cited by examiner

SPEECH ANALYZING STAGE AND METHOD FOR ANALYZING A SPEECH SIGNAL

BACKGROUND OF THE INVENTION

1. Technical Field of the Invention

The invention relates to the field of automatic speech recognition and more particularly to a speech analyzing stage and a method for analyzing a speech signal sampled at one of at least two different system sampling rates utilized in an automatic speech recognition system.

2. Discussion of the Prior Art

Automatic recognition of speech is becoming a technology which is used for controlling all types of electronic devices like mobile telephones or for obtaining access to services over a telecommunication network.

Automatic speech recognition systems can differ in respect to the spectral range in which input speech signals are analyzed. Today, many telecommunication terminals with automatic speech recognition capability focus on the spectral range up to 4 kHz by sampling an analog input speech signal using an analog-to-digital converter operated at a sampling rate of 8 kHz. A standard approach for analyzing and recognizing such digitized speech signals in an automatic speech recognition system 100 is shown in FIG. 1.

The digitized input speech signal is analyzed by means of a spectral analyzer in the form of a MEL filterbank 110. In the MEL filterbank 110 the spectral band of the input speech signal is divided into a plurality of subbands which are equidistant in the MEL spectral domain. The MEL filterbank 110 then performs a short-term spectral analysis with respect to the short-term speech energy for each subband. The spectral analysis in the MEL spectral range takes into account properties of the human speech perception since the human auditory system has a higher spectral resolution at low frequencies.

The MEL filtered speech signal is then input into a non-linear transformation block 120 which comprises for each subband analyzed by the MEL filterbank 110 an individual non-linear transformation unit. Each non-linear transformation unit of the non-linear transformation block 120 converts the speech energy comprised within the respective subband from the linear spectral domain into the logarithmic spectral domain. The output of the non-linear transformation block 120 is input into a Discrete Cosine Transformation (DCT) block 130 which transforms the speech signal into the cepstral domain. The output of the DCT block 130 consists of L acoustic parameters in the cepstral domain (cepstral parameters). The cepstral parameters are taken as input for the recognition unit 140 where pattern matching takes place. By means of pattern matching the cepstral parameters of the speech signal are compared with corresponding parameters that are stored as pre-trained reference models in a reference model database 150. Hidden Markov Models (HMM) are most often used as reference models. The reference models are trained in advance to represent the spectral characteristic of e.g. words or phonems. By means of pattern matching a recognition result can be obtained which is subsequently output by the recognition unit 140.

It has become apparent from the above that the conventional automatic speech recognition system 100 depicted in FIG. 1 analyzes the input speech signal in a spectral range up to 4 kHz by sampling the analog input speech signal at 8 kHz. Of course, higher sampling rates may be used as well. For example, personal computers often use a sampling rate of 11 kHz which represents ¼ of the 44.1 kHz used for the sampling of CDs. It is evident that a higher sampling bandwidth is connected with more spectral information so that the performance of automatic speech recognition systems generally increases if higher sampling rates are employed.

In the future it is expected that electronic devices which are operable at several sampling rates and network systems which comprise terminals operating at one of different system sampling rates will be developed. Consequently, there will arise the question how an automatic speech recognition system which allows to analyze speech signals sampled at different sampling rates may be constructed.

From "Speech processing, transmission and quality aspects (STQ); Distributed Speech Recognition; Front-end feature extraction algorithm; Compression algorithms", ETSI standard document ETSI ES 201 108 v1.1.2 (2000–04), April 2000 a proposal for a network system comprising an automatic speech recognizing system supporting three different sampling rates of 8, 11 and 16 kHz is known.

The speech analysis in this network system is based on a MEL filterbank with 23 subbands. The number of 23 MEL subbands is kept constant for all three sampling rates. This means that the subbands are differently distributed over each of the three spectral ranges of 4, 5.5 and 8 kHz (corresponding to the sampling rates of 8, 11 and 16 kHz) to be analyzed.

It is clear that by differently distributing the 23 subbands over the three spectral ranges the spectral analysis is different for each sampling rate. Consequently, one and the same reference model looks differently depending on the sampling rate at which the respective reference model has been trained. This implies that the reference models have to be trained for each sampling rate individually to guarantee optimal recognition performance. Thus, the training effort and the memory requirements for an automatic speech recognition system operable at three different sampling rates are at least increased by a factor of three.

There exists, therefore, a need for a speech analyzing stage and a method for analyzing a speech signal sampled at one of at least two different system sampling rates of an automatic speech recognition system which are user-friendly and which allow to simplify the hardware requirements of the automatic speech recognition system.

BRIEF SUMMARY

A speech analyzing stage of an automatic speech recognition system analyzes a speech signal sampled at one of at least two different system sampling rates in the spectral domain. The speech analyzing stage comprises a first spectral analyzer for analyzing the speech signal up to a first frequency and a second spectral analyzer for analyzing the speech signal at least above the first frequency.

A method for analyzing in the spectral domain a speech signal sampled at one of at least two different system sampling rates of an automatic speech recognition system comprises a first analysis step for analyzing the speech signal up to a first frequency and a second analysis step for analyzing the speech signal at least above the first frequency.

At least two spectral analyzers are provided, each spectral analyzer analyzing the speech signal in the spectral domain. The first spectral analyzer analyzes the speech signal in a lower spectral range having an upper frequency limit which is defined by a first frequency. The first frequency is preferably derived from the lowest system sampling rate. The lowest system sampling rate is the lowest sampling rate occurring in an automatic speech recognition system in which at least two different sampling rates are utilized.

As an example, the first frequency may be chosen such that it equals approximately half the lowest system sampling rate or less than half the lowest system sampling rate. Choosing the first frequency such that it equals half or less than half the lowest system sampling rate is advantageous because a speech signal sampled at the lowest system sampling rate does not contain any spectral information in a frequency range above half the lowest system sampling rate. Nevertheless, in certain cases it might be appropriate to select the first frequency such that it equals more than half the lowest system sampling rate.

The first spectral analyzer ensures a high compatibility among the components of an automatic speech recognizing system working with several system sampling rates since for all sampling rates a compatible set of acoustic parameters can be obtained. This compatible set of acoustic parameters is generated by the first spectral analyzer which independently from the sampling rate, i.e. even for the lowest sampling rate, always parametrisizes an identical spectral range up to the first frequency.

The compatible set of acoustic parameters thus allows to perform automatic speech recognition based on a single set of reference models. This has the advantage that there is e.g. no need to train an individual set of reference models for every sampling rate which is supported by the automatic speech recognition system. In other words: training of reference models on data at one sampling rate will also allow a reliable recognition of speech signals that have been sampled at a different sampling rate. Preferably, the reference models are generated using speech data sampled at the highest system sampling rate.

A further advantage is the fact that the recognition stage of an automatic speech recognition system can be simplified because the compatible set of acoustic parameters allows to perform pattern matching using one and the same pattern matching unit for acoustic parameters sampled at different sampling rates.

In has been pointed out above that the first spectral analyzer analyzes the speech signal independently from the speech signal's sampling rate up to a first frequency which is preferably derived from the lowest system sampling rate. In order to increase the performance of speech recognition it is advantageous to also analyze additional spectral information above the first frequency which is present in speech signals that have been sampled at sampling rates higher as the lowest system sampling rate. Such an analysis is performed by the second spectral analyzer which analyzes the speech signal at least in spectral range above the first frequency. The second spectral analyzer may thus generate additional acoustic parameters which contain information about the upper spectral range of the speech signal.

The second spectral analyzer can be configured to not only analyze the speech signal above the first frequency but to also analyze the speech signal below the first frequency. This will lead to redundant information since the latter spectral range is also analyzed by the first spectral analyzer. According to a preferred embodiment, the second spectral analyzer therefore analyzes the speech signal essentially only above the first frequency. This will include a minor overlapping of the spectral ranges analyzed by the first spectral analyzer and the second spectral analyzer.

If the spectral ranges analyzed by different spectral analyzers are overlapping, the overlapping is advantageously chosen such that no spectral analyzer completely analyzes a spectral range which is also analyzed by a further spectral analyzer. This means that although the spectral ranges analyzed by different spectral analyzers may overlap, each spectral analyzer analyzes a frequency band which is not analyzed by different spectral analyzer.

The analysis of the speech signal can be performed in a staged manner such that more than two individual spectral analyzers analyze the speech signal. Preferably, each individual spectral analyzer analyzes the speech signal up to an individual frequency, the highest of the individual frequencies being derived from the highest system sampling rate. Thus, a third spectral analyzer may e.g. be provided for analyzing the speech signal at least above a second frequency up to which the second spectral analyzer analyzes the speech signal. The provision of further spectral analyzers is also possible.

The individual spectral ranges analyzed by the individual spectral analyzers may be overlapping or non-overlapping. Preferably, each individual spectral analyzer analyzes an individual spectral range which is not analyzed by another spectral analyzer. This means that the first spectral analyzer may analyze the speech signal up to the first frequency, the second spectral analyzer may analyze the speech signal between the first frequency and the second frequency, and the third spectral analyzer analyzes the speech signal only above the second frequency.

The individual spectral analyzers may be arranged with respect to each other in various ways. According to a preferred embodiment, the spectral analyzers are arranged in parallel. Thus, a single speech signal may be concurrently input into the individual spectral analyzers and the individual spectral analyzers may concurrently output corresponding acoustic parameters for the spectral range analyzed by the respective spectral analyzer.

The individual spectral analyzers may have an identical construction or may have different constructions. For example, one or more spectral analyzers may be configured as energy analyzers which determine the speech energy comprised within the whole spectral range analyzed by an individual spectral analyzer or within one or more subbands of this spectral range. Preferably, at least the first spectral analyzer (which analyzes the speech signal up to the first frequency) is a filterbank, e.g. a MEL filterbank, which analyzes two or more subbands of the input speech signal with regard to the speech energy contained in each subband. The one or more spectral analyzers which follow the first spectral analyzer, e.g. the second and the third spectral analyzers, may each also be configured as filterbank. However, the spectral analyzers following the first spectral analyzer are preferably configured as energy analyzers which only integrally determine the speech energy contained in the spectral range analyzed by the respective energy analyzer. Thus, the hardware requirements for the speech analyzing stage can be reduced.

The speech analyzing stage comprising the plurality of spectral analyzers can be employed for all kinds of automatic speech recognition systems. Preferably, the speech analyzing stage is arranged in a mobile or non-mobile terminal which is part of a larger network comprising a network server and a plurality of terminals. Alternatively, the speech analyzing stage may also be arranged on the side of the network server. A speech recognition stage of the automatic speech recognition system may likewise be arranged either on the terminal side or on the side of the network server.

If the speech analyzing stage and the speech recognition stage are not co-located within the same device, a distributed speech recognition (DSR) system is created. In such a DSR system the analysis of the speech signal (i.e. the feature extraction) is done in the terminal and the extracted features are then transmitted to a central network server which comprises a common speech recognition stage for all terminals.

According to a preferred embodiment, the automatic speech recognition system is a DSR system which is working with two or more different system sampling rates. According to a first realization of such a DSR system, the DSR system comprises at least one terminal which is operable at more than one sampling rate. According to a second realization, the DSR system comprises at least a first terminal which is operated at a first sampling rate and at least one further terminal which is operated at a second sampling rate which is different from the first sampling rate.

It has become apparent from the above that in a DSR system the analyzation of the speech signal takes place in the terminals and the pattern matching in a central network server. In order to allow the transmission of the acoustic parameters created by the spectral analyzation stage from the terminal to the network server, the speech analyzing stage may further comprise a coding unit for coding acoustic parameters in accordance with a specific transmission format. Furthermore, an interface for transmitting the coded acoustic parameters to the network server can be provided. The network server may comprise a corresponding interface and a decoding unit for decoding the received coded acoustic parameters.

The technology also relates to a data signal to be transmitted from the terminal to the network server having a central speech recognition stage, the data signal comprising a first data structure relating to the sampling rate and a second data structure containing at least one codebook index derived from a codebook for a specific combination of one or more acoustic parameters obtained by analyzing the speech signal up to a first frequency and one or more further acoustic parameters obtained by analyzing the speech signal at least above the first frequency.

From the first data structure of the data signal the network server can derive the rate at which the speech signal has been sampled. It is thus possible for the network server to draw conclusions from the first data structure about the format of the analyzed speech contained in the second data structure. The second data structure contains one or more codebook indices required to identify the acoustic parameters used for the pattern matching process in the network server. Preferably, the second data structure has an individual data substructure for e.g. pairs, triplets of quadruplets of acoustic parameters.

The technology can be implemented for example as a hardware solution and as a computer program product comprising program code portions for performing the individual steps of the invention when the computer program product is run on an automatic speech recognition system. The computer program product may be stored on a computer readable recording medium like a data carrier attached to or removable from a system component.

BRIEF DESCRIPTION OF THE DRAWINGS

Further aspects and advantages of the invention will become apparent upon studying the following detailed description of preferred embodiments of the invention and upon reference to the drawings in which.

DETAILED DESCRIPTION OF THE PREFERRED EMBODIMENTS

Figure 2:
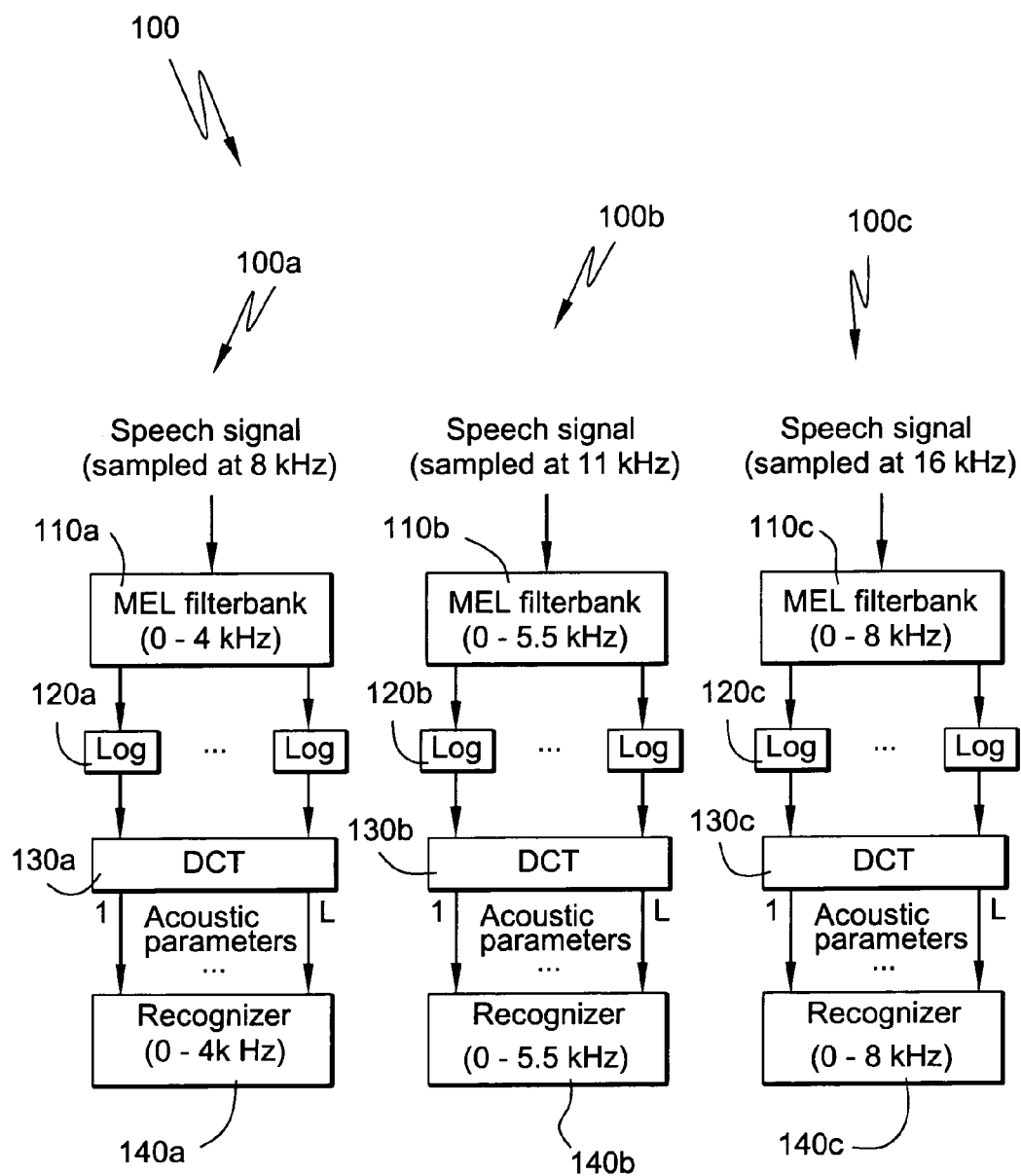
FIG. 2 is a block diagram of a possible realization of an automatic speech recognition system operating at a plurality of different system sampling frequencies.

In FIG. 2, a possible realization of an automatic speech recognition system 100 operating at multiple sampling rates is illustrated. The automatic speech recognition system depicted in FIG. 2 was derived from the previously mentioned document "Speech processing, transmission and quality aspects (STQ); Distributed Speech Recognition; Front-end feature extraction algorithm; Compression algorithms", ETSI standard document ETSI ES 201 108 v1.1.2 (2000–04), April 2000 and does not belong to the invention. However, departing from the automatic speech recognition system of FIG. 2 the inventive concept can be better understood.

Figure 1:
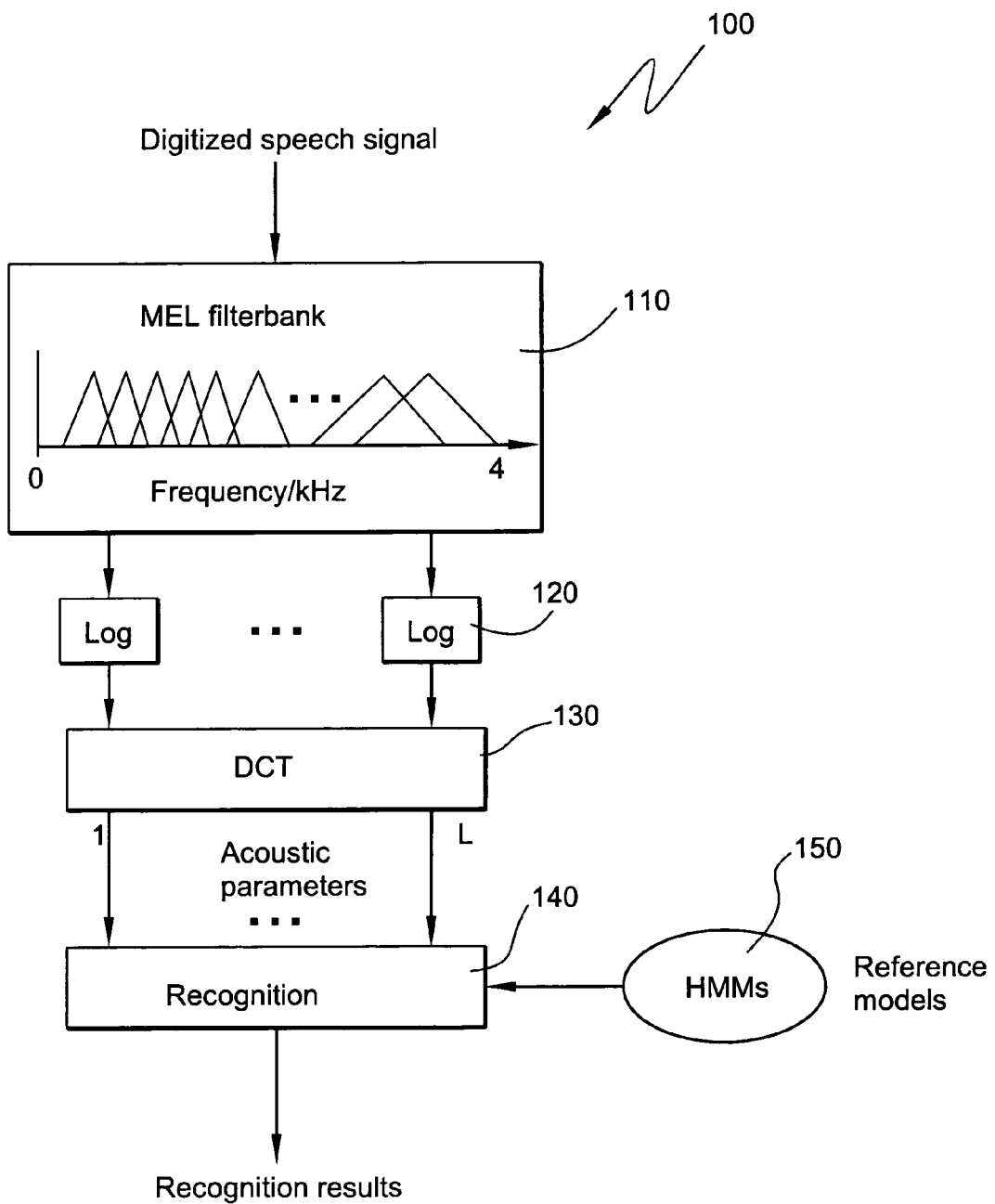
FIG. 1 is a block diagram of a conventional automatic speech recognition system.

The automatic speech recognition system 100 depicted in FIG. 2 is configured to be operated at three different system sampling frequencies, namely 8, 11 and 16 kHz. In order to support automatic speech recognition at three different sampling rates, the automatic speech recognition system depicted in FIG. 2 comprises three individual speech recognition branches 100a, 100b, 100c similar to the single speech recognition branch depicted in FIG. 1. Each of the three speech recognition branches 100a, 100b, 100c is configured to receive a speech signal sampled at a specific sampling rate. Thus, the branch 100a receives a speech signal sampled at 8 kHz, the branch 100b receives a speech signal sampled at 11 kHz, and the branch 100c receives a speech signal sampled at 16 kHz.

In accordance with section 4.2.9 of the above ETSI standard document each branch 100a, 100b, 100c comprises a spectral analyzer in the form of a MEL filterbank 110a, 100b, 110c which performs MEL filtering in a spectral band up to half of the respective sampling rate, each spectral band being divided into 23 subbands equidistant in the MEL spectral domain. The individual MEL filterbanks 110a, 110b, 110c are thus different for each sampling rate. This means that the spectral analysis (and the acoustic parameters subsequently to be used for pattern matching) is different, too. Since the acoustic parameters generated within each of the three speech recognition branches 100a, 110b, 100c are not compatible, each recognition stage 100a, 100b, 100c has to be provided with a separate pattern matching unit 140a, 140b, 140c. This in turn necessitates that each pattern matching unit 140a, 140b, 140c has to be trained separately at the respective sampling rate of the input speech signal to guarantee optimal recognition performance. Thus, the training effort and the memory requirements are at least increased by a factor of three.

Figure 3:
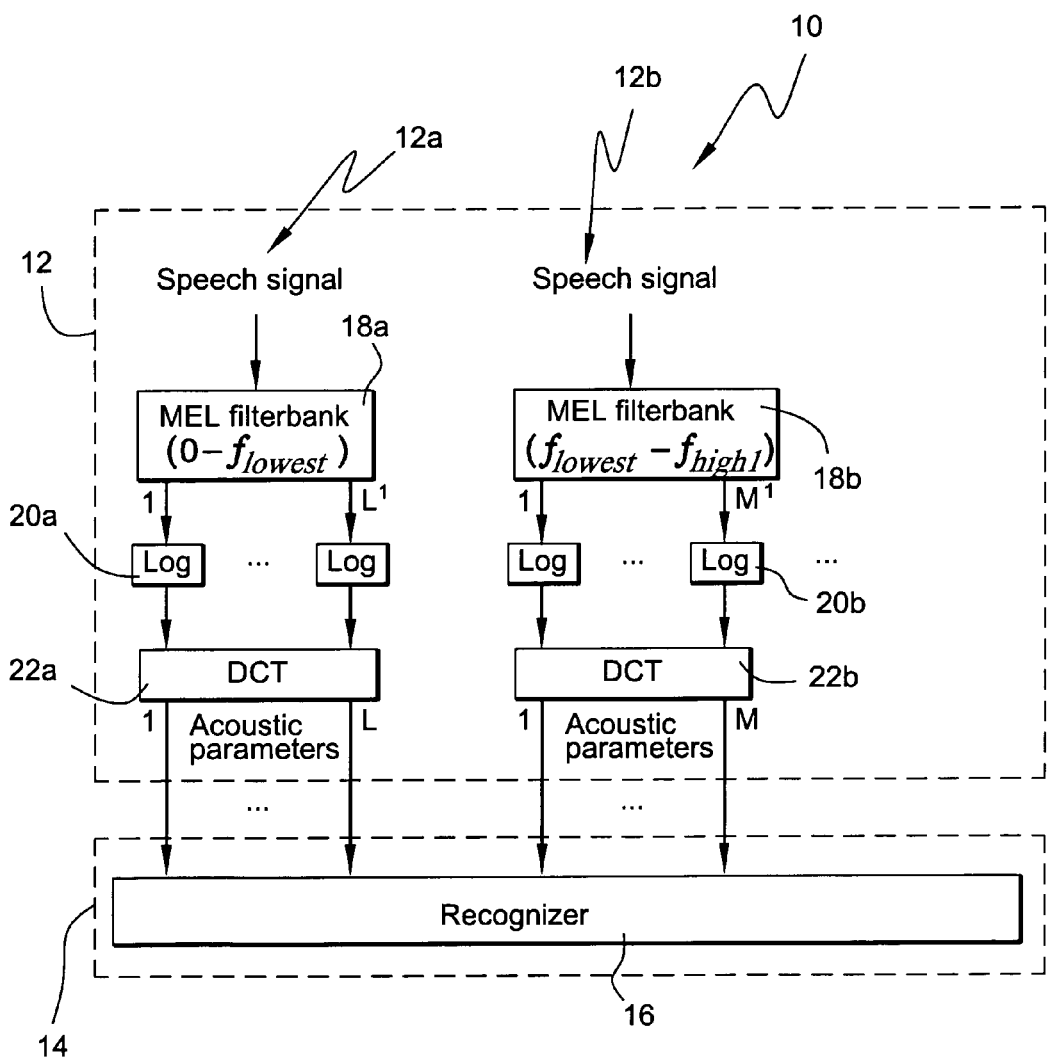
FIG. 3 is a block diagram of an automatic speech recognition system comprising a first embodiment of a speech analyzing stage.

The problems encountered with the automatic speech recognition system depicted in FIG. 2 are overcome by the automatic speech recognition system 10 depicted in FIG. 3 and comprising a first embodiment of a speech analyzing stage 12. The automatic speech recognition system 10 further comprises a recognition stage 14 with a single pattern matching unit 16. The pattern matching unit 16 performs pattern matching based on the acoustic parameters received from the speech analyzing stage 12 and based on reference models which are stored in a database not depicted in FIG. 3.

It can be seen from FIG. 3 that although the speech analyzing stage 12 comprises a plurality of speech analyzing branches 12a, 12b, the recognition stage 14 comprises only a single pattern matching unit 16 with a single reference model database not depicted in FIG. 3. The number of speech analyzing branches 12a, 12b within the speech analyzing stage 12 equals the number of sampling frequencies employed within the automatic speech recognition system 10. Each speech analyzing branch 12a, 12b comprises an individual spectral analyzer 18a, 18b in the form of a MEL filterbank, an individual non-linear transformation block 20a, 20b and an individual DCT block 22a, 22b.

In the following it is assumed that the speech analyzing stage 12 of the automatic speech recognition system 10 is disposed within a terminal in which a speech signal is sampled at a sampling rate of $2 \times f_{high1}$. The recognition stage 14 of the automatic speech recognition system 10 may be located either in the same terminal or in a remote network server. It is further assumed that the automatic speech recognition system 10 depicted in FIG. 3 supports further sampling rates of $2 \times f_{lowest}$, $2 \times f_{high2}$, etc. These further sampling rates may be supported e.g. by a terminal which also samples speech at a sampling rate of $2 \times f_{high1}$ or by another terminal configured to support only a single sampling rate different from $2 \times f_{high1}$.

The first spectral analyzer 18a arranged in the first speech analyzing branch 12a of the speech analyzing stage 12 is configured to analyze the speech signal in a spectral range up to $f_{lowest}$. This upper spectral boundary of the spectral range analyzed by the first spectral analyzer 18a was derived from the lowest system sampling rate $2 \times f_{lowest}$ by multiplying the lowest system sampling rate $2 \times f_{lowest}$ by 0.5. The upper spectral boundary of the spectral range analyzed by the first spectral analyzer 18a could also be chosen such that it equals less than half the lowest system sampling rate. As an example, if the lowest system sampling rate is 8 kHz, $f_{lowest}$ could equal 3.5 kHz.

The first spectral analyzer 18a which is configured as a MEL filterbank analyzes the speech signal with regard to the short-term speech energy contained in each of L' subbands and outputs L' acoustic parameters. The L' acoustic parameters are subsequently transformed from the linear spectral domain into the logarithmic spectral domain by means of the non-linear transformation block 20a and the output of the non-linear transformation block 20a is subjected to a Discrete Cosine Transformation within the DCT block 22a. In the DCT block 22a the L' logarithmic acoustic parameter are converted into the cepstral domain. The converted L acoustic parameters are then fed into the pattern matching unit 16 of the recognition stage 14. Usually, the number L of acoustic parameters output by the DCT block 22a is different from the number L' of acoustic parameters input into the DCT block 22a by the non-linear transformation block 20a (e.g. L<L'). The number L of acoustic parameters output by the DCT block 22a typically equals approximately half the number of acoustic parameters L' input into the DCT block 22a.

Since the speech analyzing stage 12 receives a speech signal which was sampled at a sampling rate of $2 \times f_{high1}$ and since the first spectral analyzer 18a only analyzes a spectral range up to $f_{lowest}$, the speech signal contains spectral information which is not comprised within the L' acoustic parameters output by the first spectral analyzer 18a. Therefore, the speech analyzing stage 12 comprises the second speech analyzing branch 12b with the second spectral analyzer 18b. The second spectral analyzer 18b is arranged in parallel to the first spectral analyzer 18a and receives the speech signal concurrently with the first spectral analyzer 18a.

As can be seen from FIG. 3, the second spectral analyzer 18b analyzes the speech signal in a spectral range between $f_{lowest}$ and $f_{high1}$. Since a speech signal sampled at a sampling rate of $2 \times f_{high1}$ does not contain any spectral information above $f_{high1}$, i.e. above half the sampling rate, the second spectral analyzer 18b analyzes all additional spectral information contained in the speech signal and not analyzed by the first spectral analyzer 18a.

The second spectral analyzer 18b analyzes M' subbands in the spectral range between $f_{lowest}$ and $f_{high1}$ and outputs M' ($M \geq 1$) acoustic parameters. These M' acoustic parameters are then fed into the non-linear transformation block 20b and transformed from the linear spectral domain into the logarithmic spectral domain. The output of the non-linear transformation block 20b is fed into the DCT block 22b and the M ($M \leq M'$) acoustic parameters output by the DCT block 22b are fed into the pattern matching unit 16 of the recognition stage 14.

The speech analyzing stage 12 depicted in FIG. 3 is part of a terminal which samples an analog speech signal at a sampling rate of $2 \times f_{high1}$. It has been pointed out above that the automatic speech recognition system 10 depicted in FIG. 3 may further comprise a terminal which samples an analog speech signal at a sampling rate of $2 \times f_{lowest}$, $2 \times f_{lowest}$ being the lowest sampling rate within the automatic speech recognition system 10. Although such a terminal may be equipped with the speech analyzing stage 12 depicted in FIG. 3, it would be sufficient to equip such a terminal with a speech analyzing stage comprising only a single speech analyzing branch similar to the speech analyzing branch 12a depicted in FIG. 3. This is due to the fact that a speech signal sampled at a sampling rate of $2 \times f_{lowest}$ does not comprise any spectral information above $f_{lowest}$.

Such a terminal comprising only a single speech analyzing branch similar to the speech analyzing branch 12a depicted in FIG. 3 would produce a set of L acoustic parameters which is compatible to the set of L acoustic parameters generated by the first speech analyzing branch 12a of the speech analyzing stage 12 depicted in FIG. 3. This means that although the automatic speech recognition system 10 may comprise terminals which operate at different sampling rates, every terminal comprises independently from the actual sampling rate a speech analyzing branch which is similar to the speech analyzing branch 12a depicted in FIG. 3 and which thus produces a compatible output. This ensures a high compatibility within the automatic speech recognition system 10.

Figure 4:
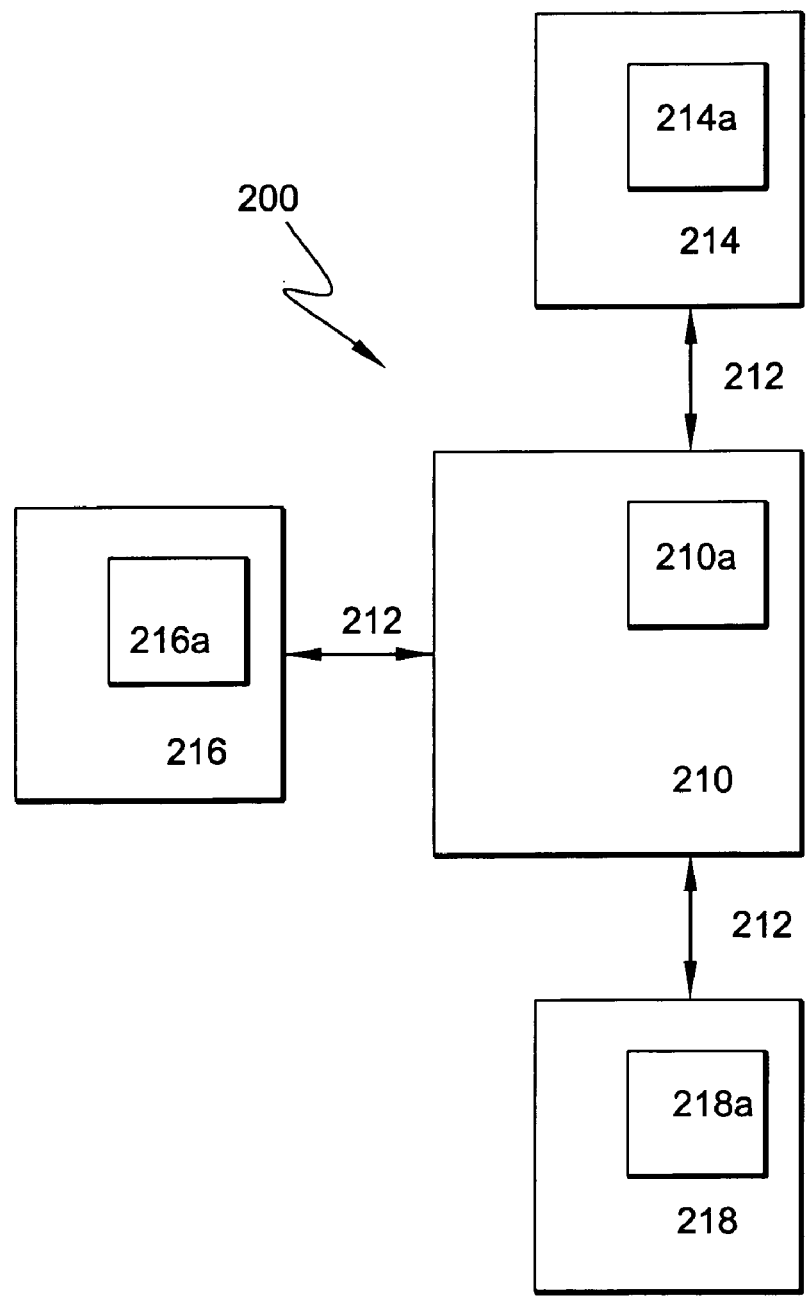
FIG. 4 is a block diagram of a distributed speech recognition system.

FIG. 4 depicts an example DSR system 200. The DSR system 200 comprises a single network server 210 with a central recognition stage 210a. The network server 210 communicates via wired or wireless communication links 212 with three terminals 214, 216, 218, e.g. mobile telephones.

Each terminal 214, 216, 218 comprises a respective speech analyzing stage 214a, 216a, 218a. The three terminals 214, 216, 218 are operated at different sampling rates, i.e. the first terminal 214 is operated at a sampling rate of 8 kHz, the second terminal 216 is operated at a sampling rate of 11 kHz and the third terminal 218 is operated at a sampling rate of 16 kHz. In the following, the speech analyzing stage 218a of the third terminal 218 operated at a sampling rate of 16 kHz is described in more detail with reference to FIG. 5.

Figure 5:
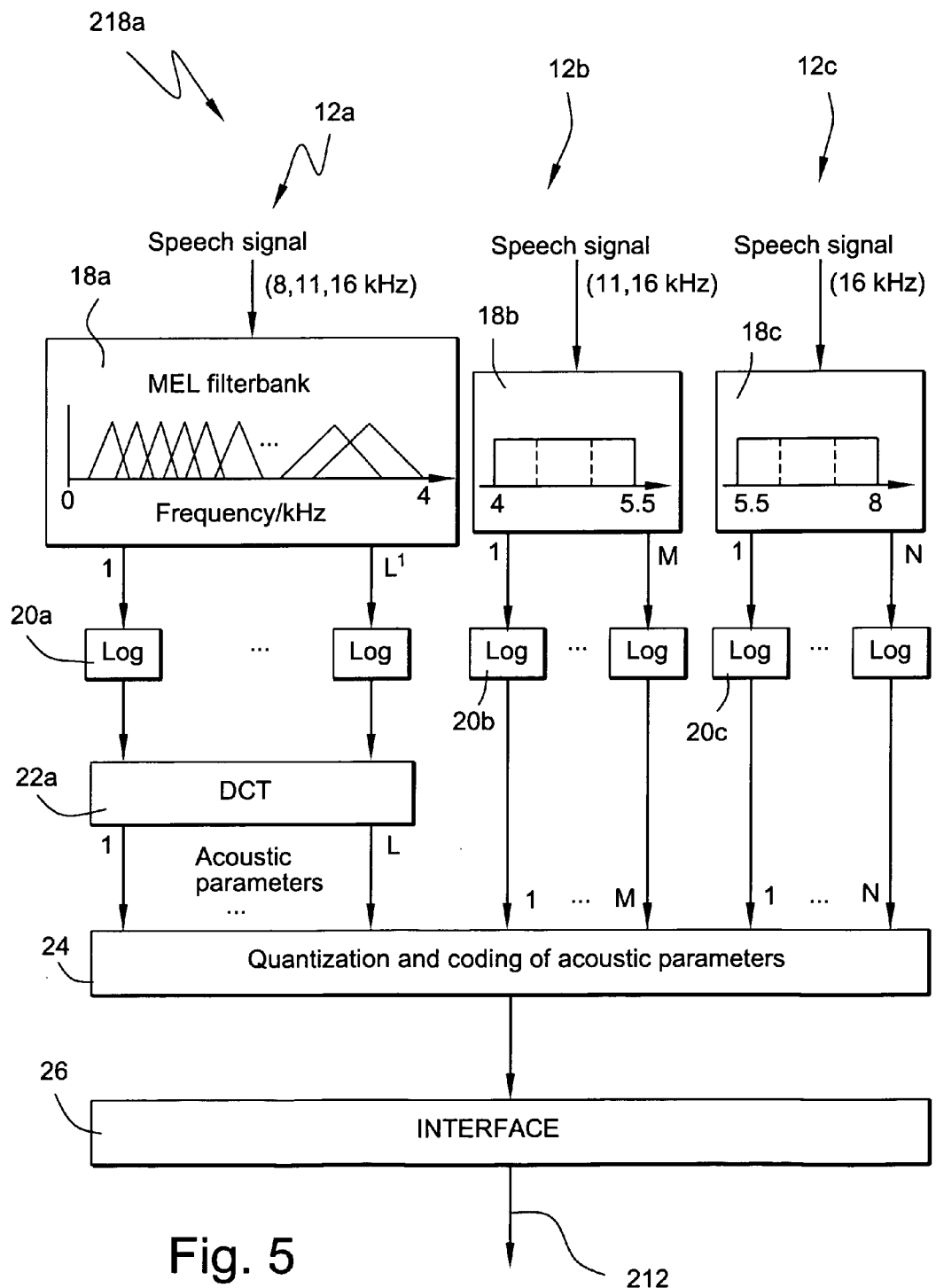
FIG. 5 is a block diagram of a second embodiment of a speech analyzing stage which may be used in the DSR systems of FIG. 4.

In FIG. 5, the speech analyzing stage 218a of the third terminal 218 depicted in FIG. 4 is further illustrated. The speech analyzing stage 218a depicted in FIG. 5 has some similarities with the speech analyzing stage of FIG. 3. Corresponding elements have therefore been designated with the same reference signs.

The speech analyzing stage 218a depicted in FIG. 5 comprises three different speech analyzing branches 12a, 12b, 12c corresponding to the number of different sampling rates used in the DSR system 200 of FIG. 4. The first speech analyzing branch 12a is identical with the first speech analyzing branch of the speech analyzing stage depicted in FIG. 3. Again, the first spectral analyzer 18a, which analyzes the speech signal up to 4 kHz, is configured as a MEL filterbank. This means that the spectral analyzer 18a does not integrally determine the short-term speech energy comprised within the spectral range up to 4 kHz. Instead, the first spectral analyzer 18a divides the spectral range up to 4 kHz into a plurality of subbands and determines the respective short-term speech energy for each subband individually.

The further speech analyzing branches 12b, 12c of the speech analyzing stage 218a deviate from the speech analyzing branches depicted in FIG. 3 in that the second and third spectral analyzers 18b, 18c are configured as energy analyzers which integrally determine the speech energy in the respective spectral ranges. Moreover, the speech analyzing branches 12b, 12c do not comprise DCT units. The hardware costs of the speech analyzing stage 218a can thus be reduced compared with the speech analyzing stage depicted in FIG. 2.

As can be seen from FIG. 5, the second spectral analyzer 18b analyzes the spectral range between 4 and 5.5 kHz and outputs M (M≧1) additional acoustic parameters relating to the speech energy in this spectral range. The third spectral analyzer 18c analyzes the spectral range between 5.5 kHz and 8 kHz and outputs N (N≧1) additional acoustic parameters relating to the speech energy in this spectral range.

Altogether, the three spectral analyzers 18a, 18b, 18c of the speech analyzing stage 218 output L+M+N acoustic parameters which due to the DSR concept have to be transmitted to the central recognition stage 210a of the remote network server 210 of FIG. 4. For the purpose of transmitting the acoustic parameters to the remote network server the speech analyzing stage 218a comprises a coding unit 24 for quantizing and coding the acoustic parameters to be transferred to the network server. The quantized and coded acoustic parameters output by the coding unit 24 are transferred to an interface 26 of the speech analyzing stage 218a and are transmitted via the interface 26 by means of a wired or wireless communication link 212 to the network server 210 of FIG. 4. The recognition stage 210a of the network server 210 comprises an interface not depicted in FIG. 4 for receiving the quantized and coded acoustic parameters via the communication links 212 from the terminals 214, 216, 218. The recognition stage 210a of the network server 210 further comprises a decoding unit for dequantizising the received acoustic parameters. The decoding unit of the recognition stage 210a is not depicted in FIG. 4.

The interface 26 and the coding unit 24 of the speech analyzation stage 218a of FIG. 4 could be omitted if the DSR approach is waived and the speech analyzing stage 218a and the corresponding recognition stage 210a are both located either in the terminal 218 or alternatively in the network server 210.

It has been mentioned above that the speech analyzing stage 218a depicted in FIG. 5 is part of the DSR system 200 which supports three different sampling rates of 8 kHz, 11 kHz and 16 kHz. The speech analyzing stage 218a depicted in FIG. 5 comprising three speech analyzing branches 12a, 12b, 12c is part of the terminal 218 which can be operated at least at a sampling rate of 16 kHz.

The further terminal 216 operated at a sampling rate of 11 kHz could be constructed using a speech analyzation stage 216a with only the first two speech analyzing branches 12a, 12b depicted in FIG. 5 since a speech signal sampled at 11 kHz does not comprise spectral information above 5.5 kHz. For the same reason the speech analyzation stage 214a of the terminal 214 operated at a sampling rate of 8 kHz would only require a single speech analyzing branch similar to the speech analyzing branch 12a depicted in FIG. 5.

On the side of the network server 210 depiced in FIG. 4, the recognition stage 210a could comprise an individual pattern matching unit for each sampling rate supported by the DSR system 200. However, a single pattern matching unit for all sampling rates would be sufficient. The reference models for this single pattern matching unit can be trained on speech signals processed with the highest sampling rate, i.e. 16 kHz. These speech models contain the whole set of possible acoustic parameters. In case a speech signal sampled at a lower sampling rate has to be recognized, the pattern matching unit then only employs a corresponding number of acoustic parameters for pattern matching.

It thus becomes clear that in a DSR system supporting different sampling rates, terminals operated at different sampling rates will transmit different numbers of acoustic parameters to the network server. As an example derived from FIG. 5, a terminal operated at a sampling rate of 16 kHz would transmit L+M+N acoustic parameters to the network server, whereas a terminal operated at a sampling rate of 11 kHz would transmit L+M acoustic parameters and a terminal operated at a sampling rate of 8 kHz would only transmit L acoustic parameters. However, this does not necessarily mean that the data rate of the data stream between the terminals and the network server will become higher for terminals operated at higher sampling rates. The data rate could be kept constant by adapting the quantization scheme to the different number of parameters as outlined below.

According to a possible realization of the DSR system 200 of FIG. 4 and the speech analyzing stage 218a of FIG. 5 a set of 13, 14 and 15 acoustic parameters is determined for each 25 millisecond speech frame at a sampling rate of 8 kHz, 11 kHz and 16 kHz respectively. Thus, L equals 13 and M and N both equal 1.

A first of the L=13 acoustic parameters output by the DCT block 22a represents the logarithmic frame energy and is linearly quantized by the coding unit 24 with 8 bits. Thus, the range of energy values is splitted into 256 intervals corresponding to the 8 bit resolution. The other twelve acoustic parameters output by the DCT block 22a are quantized in pairs with seven bits for the first two pairs, six bits for the second two pairs, and five bits for the third two pairs as shown in the following table:

| acoustic parameters | number of levels (entries) | Bits/coding index |
| --- | --- | --- |
| $c_1, c_2$ | 128 | 7 |
| $c_3, c_4$ | 128 | 7 |
| $c_5, c_6$ | 64 | 6 |
| $c_7, c_8$ | 64 | 6 |
| $c_9, c_{10}$ | 32 | 5 |
| $c_{11}, c_{12}$ | 32 | 5 |

As can be seen from the table, a higher number of bits, i.e. levels, is chosen for the acoustic parameters of lower order because these acoustic parameters contain spectral information of higher importance. In total, 44 bits are needed to code the acoustic parameters contained in one acoustic vector with 13 acoustic parameters (eight bits for the acoustic parameters relating to the logarithmic frame energy, two times seven bits for the first two pairs of acoustic parameters, two times six bits for the second two pairs of acoustic parameters and two times five bits for the third pair of acoustic parameters).

The acoustic parameters depicted in the above table are coded using split vector codebooks. The six pairs of acoustic parameters are coded such that for each pair of acoustic parameters one coding index is obtained from a corresponding codebook. Thus, six codebooks are required to code the six pairs of acoustic parameters. Each codebook is created by means of applying a vector quantization algorithm as is known in the art.

Figure 6A:
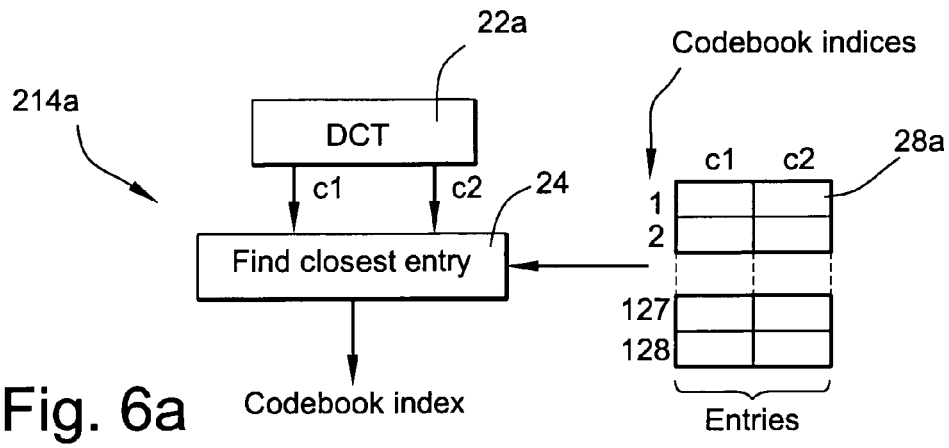
FIG. 6a to 6c are block diagramms showing the use of codebooks in speech analyzing stages.
Figure 6B:
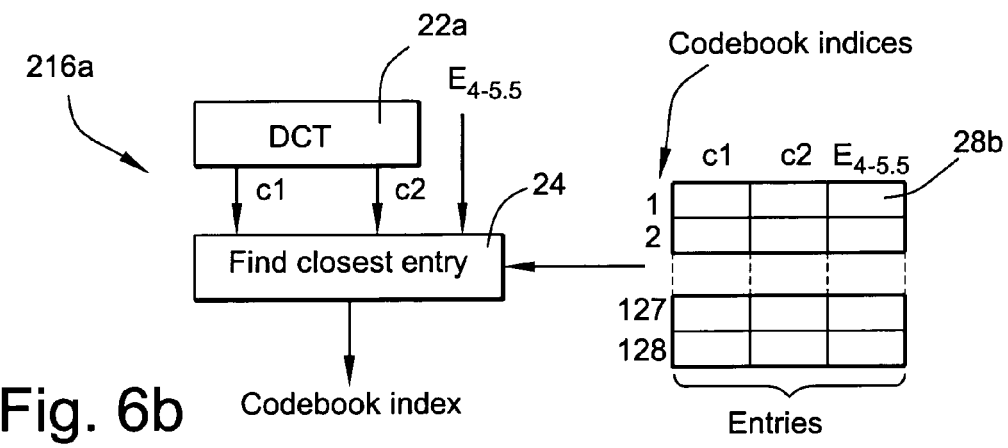
Figure 6C:
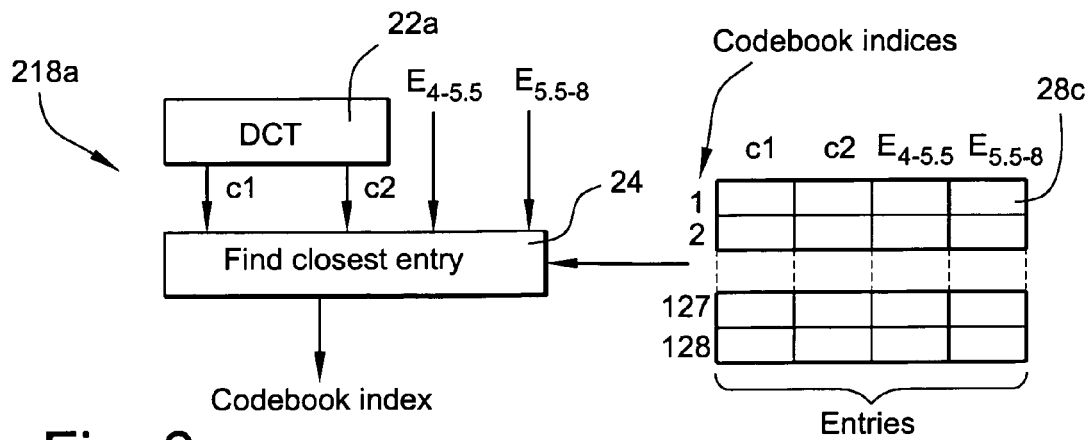

In FIGS. 6a, 6b and 6c the codebooks 28a, 28b and 28c used for coding acoustic parameters obtained at a sampling rate of 8 kHz, 11 kHz and 16 kHz, respectively, are illustrated. In FIG. 6a, determination of a codebook index for the acoustic parameters $c_1$ and $c_2$ obtained at a sampling rate of 8 kHz within the terminal 214 depicted in FIG. 4 is illustrated. Based on the two acoustic parameters $c_1$, $c_2$ output by the DCT block 22a, the coding unit 24 looks for the corresponding entry comprised within the codebook 28a which is closest to the output $c_1$, $c_2$ of the DCT block 22a. Then, the codebook index of the closest entry is determined. Five further codebook indices are obtained in the same manner for the five further pairs of acoustic parameters output by the DCT block 22a. Thus, five further codebooks not depicted in FIG. 6a have to be provided. The six individual codebook indices determined by the coding unit 24 are then combined to a data signal described below in more detail with reference to FIG. 7.

In FIG. 6b, determination of the codebook index for the acoustic parameters $c_1$ and $c_2$ obtained at a sampling rate of 11 kHz within the terminal 216 is illustrated. The codebook 28b deviates from the codebook 28a depicted in FIG. 6a in that the codebook 28b comprises a further column $E_{4\text{-}5.5}$ relating to the speech energy contained within the speech signal in a frequency range between 4 kHz and 5.5 kHz. The value of $E_{5.5}$ is determined by a speech analyzing branch similar to the speech analyzing branch 12b depicted in FIG. 5.

The coding unit 24 of FIG. 6b receives not only the two acoustic parameters $c_1$ and $c_2$ but also the further acoustic parameter $E_{4\text{-}5.5}$. Based on this triplet of acoustic parameters, the coding unit 24 determines the closest entry within the codebook 28b. Thus, a corresponding codebook index is obtained. Five further codebooks utilized for coding the five further pairs of acoustic parameters are constituted like the five corresponding codebooks utilized for coding the five further acoustic parameters obtained at a sampling rate of 8 kHz (FIG. 6a).

In FIG. 6c, determination of the codebook index for the acoustic parameters $c_1$, $c_2$, $E_{5.5}$ and $E_{5.5\text{-}8}$ obtained within the terminal 218 at a sampling rate of 16 kHz is illustrated. The codebook 28c depicted in FIG. 6c deviates from the codebook 28b depicted in FIG. 6b in that it comprises a further column for the acoustic parameter $E_{5.5\text{-}8}$. The codebook index for the quadruplet of acoustic parameters $c_1$, $c_2$, $E_{5.5}$ and $E_{5.5\text{-}8}$ is determined in a similar manner as described above with reference to FIG. 6b.

If the coding concept illustrated with reference to FIGS. 6a to 6c is employed in the DSR system 200 depicted in FIG. 4, eight different codebooks are utilized and have to be generated. Three of these codebooks 28a, 28b, 28c are depicted in FIGS. 6a, 6b, 6c, respectively. Five more codebooks are needed for coding the five further pairs of acoustic parameters. On the side of the network server 210, all eight different codebooks have to be provided. On the side of the terminals 214, 216, 218, the provision of six codebooks per terminal 214, 216, 218 is sufficient. Each of the terminals 214, 216, 218 comprises the corresponding codebook 28a, 28b, 28c depicted in FIGS. 6a, 6b, 6c, respectively, as well as a set of five more codebooks for coding the five further pairs of acoustic parameters. In principle, the coding and decoding of the first pair of acoustic parameters will work at all sampling rates with just the codebook containing four components per entry as depicted in FIG. 6c. This means that it would be sufficient to provide each of the terminals 214, 216, 218 depicted in FIG. 4 with the codebook 28c depicted in FIG. 6 and a set of five more codebooks for coding the five further pairs of acoustic parameters.

Each of the three different codebooks depicted in FIG. 6a to 6c has to be individually trained on speech data sampled at the corresponding sampling rate and can be prestored in an EPROM upon production of the terminals 214, 216, 218 and the network server 210 depicted in FIG. 4.

By means of the coding concept described above with reference to FIGS. 6a to 6c, it is guaranteed that each individual terminal 214, 216, 218 depicted in FIG. 4 codes an individual number of acoustic parameters with 44 bits. Thus, high compatibility and a constant data rate within the DSR system 200 is guaranteed. Preferably, the data rate used within the DSR system 200 is 4.800 bit/s.

Figure 7:
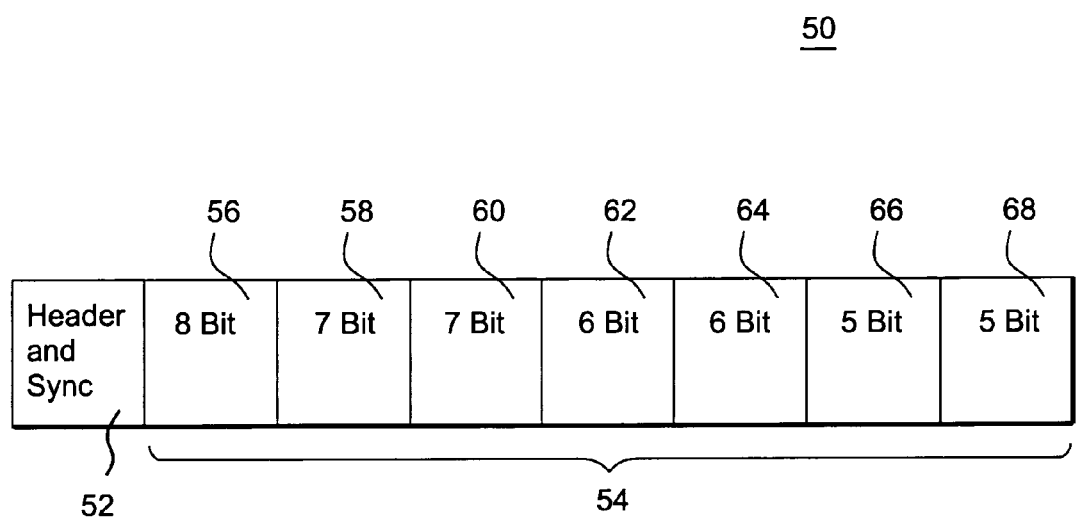
FIG. 7 is a schematic diagram of a data signal to be used in the DSR system of FIG. 4.

In FIG. 7, the overall data structure of a data signal 50 to be transmitted from one of the terminals 214, 216, 218 to the network server 210 is depicted. The data signal 50 comprises a first data structure 52 which contains synchronization information and header information relating to the sampling rate at which the corresponding speech signal has been sampled. A second data structure 54 of the data signal 50 contains a plurality of data substructures 56 to 68. The first data substructure 56 relates to the logarithmic frame energy which was linearly quantized with eight bits. The six remaining data structures relate to the codebook indices for the six pairs of acoustic parameters $c_1$ to $c_{12}$ (see above table). The second data substructure 58 contains the seven-bit codebook index which was generated as explained above with reference to FIGS. 6a to 6c. This means that the codebook index contained in the second data substructure 58 was derived from one of the codebooks 28a, 28b, 28c for a specific combination of the first two acoustic parameters $c_1$, $c_2$ and the one or two further acoustic parameters $E_{5.5}$, $E_{5.5\text{-}8}$ which were obtained by analyzing the speech signal in upper frequency ranges. The five further data substructures 60 to 68 depicted in FIG. 7 relate to the five further pairs of acoustic parameters depicted in the above table. Altogether, the seven data substructures 56 to 68 contain 44 bits of information.

The performance of a DSR system 200 as the one depicted in FIG. 4 has been theoretically modelled using the speech database "TIDigits". This speech database comprises 8.700 sequences of digits (comprising altogether 28.000 spoken digits) spoken by different speakers for training purposes and approximately the same number for testing purposes.

In a first step, the TIDigets have been downsampled from 20 kHz to 8 kHz, 11 kHz and 16 kHz corresponding to the sampling rates used by the DSR system 200 depicted in FIG. 4. A lowpass filtering has then been applied to the downsampled speech data at about half of each sampling rate. A set of 13, 14 and 15 acoustic parameters, respectively, has been determined for each 25 millisecond speech frame. Thus, L equals 13 and M and N both equal 1. The standard Delta parameters as well as two additional parameters created by LDA-derived filtering have then been taken as contents of each feature vector. A feature vector thus consists of 39 components at a sampling rate of 8 kHz, of 42 components at 11 kHz, and of 45 components at 16 kHz.

Reference models (HMMs) have been determined at each sampling frequency without adding any type of background noise to the speech. The experiments have thus been made on clean speech data only. In the following table the word error rates are listed for all possible combinations of training the system at one of the three sampling rates and recognizing the speech data at one of the three sampling rates.

| HMMs trained on | testing at sampling rate of 8 kHz | testing at sampling rate of 11 kHz | testing at sampling rate of 16 kHz |
| --- | --- | --- | --- |
| 8 kHz | 1.04 | 1.10 | 1.02 |
| 11 kHz | 1.03 | 0.75 | 0.84 |
| 16 kHz | 1.07 | 0.89 | 0.84 |

From the table it can be seen that for HMMs trained at a sampling rate of 16 kHz a high recognition accuracy (word error rates smaller than 1.07%) can be expected independently of the sampling rate of the speech signal. Moreover, a gain can be seen when moving from the lowest sampling to higher sampling rate and applying HMMs trained at the respective sampling rate. No further gain can be achieved when moving from 11 kHz to 16 kHz. This is not surprising because there exists only little spectral information in speech signals above 5.5 kHz. From the table it also becomes clear that independently from the sampling rate of a terminal a high recognition performance can be obtained for all HMMs.

The invention claimed is:

1. A speech analyzing stage for analyzing in the spectral domain a speech signal sampled at one of at least two different system sampling rates, comprising:
   a first spectral analyzer for analyzing the speech signal up to a first frequency; and
   a second spectral analyzer for analyzing the speech signal at least above the first frequency.

2. The speech analyzing stage according to claim 1, wherein the first frequency is derived from a lowest sampling rate.

3. The speech analyzing stage according to claim 1, wherein the second spectral analyzer analyzes the speech signal only above the first frequency.

4. The speech analyzing stage according to claim 1, wherein the second spectral analyzer analyzes the speech signal up to a second frequency and further comprising a third spectral analyzer for analyzing the speech signal at least above the second frequency.

5. The speech analyzing stage according to claim 4, wherein the third spectral analyzer analyzes the speech signal only above the second frequency.

6. The speech analyzing stage according to claim 1, wherein the spectral analyzers are arranged in parallel.

7. The speech analyzing stage according to claim 1, wherein at least one of the spectral analyzers is an energy analyzer.

8. The speech analyzing stage according to claim 7, wherein at least one energy analyzer is configured as a filterbank.

9. The speech analyzing stage according to claim 1, further comprising at least one coding unit for coding acoustic parameters of the sampled speech signal.

10. The speech analyzing stage according to claim 9, further comprising an interface for transmitting the coded acoustic parameters to a remote network server.

11. A speech analyzing stage in an automatic speech recognition system, the speech analyzing stage being utilized for analyzing in a spectral domain a speech signal which is sampled at one of at least two different system sampling rates and comprising:
    a first spectral analyzer for analyzing the speech signal in a lower spectral range up to an upper frequency limit which is derived from a lowest system sampling rate; and
    a second spectral analyzer for analyzing the speech signal, the second spectral analyzer being arranged in parallel to the first spectral analyzer.

12. A distributed speech recognition system for recognizing speech signals sampled at one of at least two different system sampling rates, the system comprising:
    a) at least one terminal with
       a first spectral analyzer for analyzing the speech signals up to a first frequency;
       a second spectral analyzer for analyzing the speech signal at least above the first frequency;
    b) a network server with a central speech recognition stage.

13. A data signal to be transmitted from a terminal to a network server within an automatic speech recognition system in which speech signals are sampled at two or more different system sampling rates, the data signal comprising a first data structure relating to a sampling rate at which a speech signal has been sampled and a second data structure comprising a codebook index derived from a codebook for a specific combination of one or more acoustic parameters obtained by analyzing the speech signal up to a first frequency and one or more further acoustic parameters obtained by analyzing the speech signal at least above the first frequency.

14. A method of analyzing a speech signal sampled at one of at least two different system sampling rates utilized by an automatic speech recognition system, comprising
    a first analysis step for analyzing the speech signal up to a first frequency;
    a second analysis step for analyzing the speech signal at least above the first frequency.

15. The method according to claim 14, wherein in the second analysis step the speech signal is analyzed only above the first frequency.

16. The method according to claim 14, wherein in the second analysis step the speech signal is analyzed up to a second frequency and further comprising a third analysis step for analyzing the speech signal at least above the second frequency.

17. The method according to claim 16, wherein in the third analysis step the speech signal is analyzed only above the second frequency.

18. The method according to claim 14, wherein the analysis steps for the speech signal are performed in parallel.

19. The method according to claim 14, further comprising obtaining acoustic parameters from the analyzed speech signal, coding the acoustic parameters, and transmitting the coded acoustic parameters to a network server.

20. A computer program product comprising program code portions for performing in an automatic speech recognition system the steps of:
- sampling a speech signal at one of at least two different system sampling rates;
- performing a first analysis step for analyzing the sampled speech signal up to a first frequency; and
- performing a second analysis step for analyzing the sampled speech signal at least above the first frequency.

21. The computer program product of claim 20, stored on a computer readable recording medium.

22. A speech analyzing stage for analyzing in the spectral domain a speech signal sampled at a selected one of at least two different system sampling rates, comprising:
- a first spectral analyzer for analyzing, up to a first frequency, the speech signal sampled at the selected sampling rate; and
- a second spectral analyzer for analyzing, at least above the first frequency, the same speech signal sampled at the selected sampling rate.

23. A speech recognition system comprising:
- a speech analyzing stage for recognizing a speech signal sampled at a selected one of at least two different system sampling rates, the speech analyzing stage comprising plural spectral analyzers including:
  - a first spectral analyzer for analyzing, up to a first frequency, the speech signal sampled at the selected sampling rate; and
  - a second spectral analyzer for analyzing, at least above the first frequency, the same speech signal sampled at the selected sampling rate; and
- a recognition stage having a single pattern matching unit which serves the plural spectral analyzers.

24. The speech recognition system of claim 23, wherein a number of the plural spectral analyzers equals a number of different system samping rates.

25. The speech recognition system of claim 23, wherein at least one of the spectral analyzers is situated in a terminal and the recognition stage is located in a remote network server.

26. The speech recognition system of claim 25, wherein the first spectral analyzer comprises:
- a first filter bank for generating L' number of acoustic parameters in a linear spectral domain;
- a first non-linear transformation unit for transforming the L' number of acoustic parameters into a logarithmic spectral domain; and
- a first Discrete Cosine Transformation unit for converting the L' number of acoustic parameters into L number acoustic parameters in a cepstral domain for feeding to the recognition stage;

the second spectral analyzer comprises:
- a second filter bank for generating M number of acoustic parameters in a linear spectral domain;
- a second non-linear transformation unit for transforming the M number of acoustic parameters into a logarithmic spectral domain;

wherein the the M number of acoustic parameters in the logarithmic spectral domain are fed to the recognition stage, thereby obviating need of a Discrete Cosine Transformation unit for the second spectral analyer.

* * * * *